(12) United States Patent
Todaka et al.

(10) Patent No.: US 9,868,538 B2
(45) Date of Patent: Jan. 16, 2018

(54) WATER INFLOW PREVENTION DEVICE FOR AIRCRAFT WORKING WHEN LANDING IN WATER, PRESSURE ADJUSTING VALVE, AND AIRCRAFT

(71) Applicant: Mitsubishi Aircraft Corporation, Aichi (JP)

(72) Inventors: Shimpei Todaka, Tokyo (JP); Shingo Kawano, Tokyo (JP); Takashi Uchino, Tokyo (JP); Kiyonori Kushioka, Tokyo (JP); Tsutomu Kawamizu, Tokyo (JP); Atsushi Fujii, Tokyo (JP); Yuta Takahashi, Tokyo (JP); Shuichi Hagino, Aichi (JP); Akitaka Urano, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 0 days.

(21) Appl. No.: 15/041,371

(22) Filed: Feb. 11, 2016

(65) Prior Publication Data
US 2016/0251084 A1    Sep. 1, 2016

(30) Foreign Application Priority Data
Feb. 27, 2015  (JP) .................................. 2015-038331

(51) Int. Cl.
*B64C 1/00* (2006.01)
*B64D 25/00* (2006.01)
*B64D 13/02* (2006.01)

(52) U.S. Cl.
CPC ............. *B64D 25/00* (2013.01); *B64D 13/02* (2013.01); *Y02T 50/44* (2013.01)

(58) Field of Classification Search
CPC .. B64D 25/00; B64D 13/02; B64D 2001/009; F16K 31/22; F16K 31/30; F16K 31/001; F16K 31/13
See application file for complete search history.

(56) References Cited

U.S. PATENT DOCUMENTS

| | | | | |
|---|---|---|---|---|
| 1,851,084 A | * | 3/1932 | Brown ...................... | B63J 2/10 114/212 |
| 2,424,764 A | * | 7/1947 | Marshall, Jr. .......... | B64D 13/02 137/494 |
| 2,598,002 A | * | 5/1952 | Langdon ............... | F16K 15/147 137/218 |
| 2,598,274 A | * | 5/1952 | Krueger .............. | F16K 17/0453 137/489 |
| 3,728,955 A | * | 4/1973 | Ricaud ................... | B64D 13/02 454/71 |
| 4,463,774 A | * | 8/1984 | Gorges .................. | B64C 1/1453 137/238 |

(Continued)

FOREIGN PATENT DOCUMENTS

JP    2014-019174    2/2014

*Primary Examiner* — Philip J Bonzell
(74) *Attorney, Agent, or Firm* — Pearne & Gordon LLP

(57) ABSTRACT

The present invention provides a water inflow prevention device that prevents an inflow of water into an aircraft when the aircraft lands in water through a communication passage allowing the inside and outside of the aircraft to communicate with each other. The water inflow prevention device includes a mesh part provided in the communication passage, through the mesh part a fluid flowing through the communication passage passes.

17 Claims, 14 Drawing Sheets

(56) References Cited

U.S. PATENT DOCUMENTS

| | | | | |
|---|---|---|---|---|
| 5,105,729 A * | 4/1992 | Signoret | ................ | B64D 13/02 |
| | | | | 137/487.5 |
| 6,412,731 B1 * | 7/2002 | Gabriel | .................. | B64C 15/14 |
| | | | | 244/12.1 |
| 7,493,947 B2 * | 2/2009 | Ross | ....................... | E21B 34/08 |
| | | | | 166/228 |
| 2006/0175065 A1 * | 8/2006 | Ross | ....................... | E21B 34/08 |
| | | | | 166/386 |
| 2013/0059518 A1 * | 3/2013 | Biegemann | ............ | B64D 25/00 |
| | | | | 454/74 |
| 2014/0014195 A1 | 1/2014 | Kawano et al. | | |

\* cited by examiner

120
WATER INFLOW PREVENTION DEVICE FOR AIRCRAFT WORKING WHEN LANDING IN WATER, PRESSURE ADJUSTING VALVE, AND AIRCRAFT

BACKGROUND OF THE INVENTION

Field of the Invention

The present invention relates to a water inflow prevention device for aircraft working when landing in water, and a pressure adjusting valve including the device.

Description of the Related Art

An aircraft includes a pressure adjusting valve to adjust pressure in the aircraft during a flight by adjusting opening of the valve. The pressure adjusting valve is opened when flight altitude is low. Thus, when an aircraft lands in the sea or a river in an emergency, water may enter the inside of the aircraft through the pressure adjusting valve.

At the time of an emergency landing in water, a pilot can perform an operation of closing a pressure adjusting valve. However, the pilot has other operations of higher priority to handle during an emergency.

Thus, there is provided a device for preventing an inflow of water through a pressure adjusting valve at the time of an emergency landing in water even if no operation of closing pressure adjusting valve is performed (refer to Japanese Patent Laid-Open No. 2014-19174, hereinafter referred to as Patent Literature 1). Patent Literature 1 describes a pressure adjusting valve that is closed at the time of landing in water by using a lid with a float that floats in water, or an expanding object that expands when being immersed in water.

Although a certain effect of preventing an inflow of water into an aircraft is expected by using the device described in Patent Literature 1, it is desired to expand use of means capable of preventing the inflow of water into the aircraft in terms of requirements for aircraft, such as improvement in reliability, reduction in weight, and ease of maintenance.

It is an object of the present invention to provide a water inflow prevention device for aircraft, capable of meeting such requirements, and a pressure adjusting valve including the device.

SUMMARY OF THE INVENTION

The present invention provides a device that prevents an inflow of water into an aircraft, when the aircraft lands in water, through a communication passage allowing the inside and outside of the aircraft to communicate with each other, the communication passage including a mesh part through which a fluid flowing through the communication passage passes.

The water inflow prevention device of the present invention has a feature of preventing an inflow of water into the inside of the aircraft through the communication passage when landing in water by clogging the mesh part with objects floating in the water.

The water inflow prevention device of the present invention is favorably available for preventing an inflow of water into the inside of the aircraft through a flow channel in which a valve element of a pressure adjusting valve for adjusting air pressure in the aircraft is positioned.

It is preferable that the water inflow prevention device of the present invention includes a container that contains particles being able to flow along with water, and the container is opened when landing in water.

It is also preferable that the container is positioned on an upstream side of a flow of water, which flows into the communication passage when landing in water on the basis of pressure difference between the inside and around the communication passage, with respect to the mesh part.

To open the container when landing in water, it is preferable that at least a part of the container has at least one of characteristics of dissolving in water and of being broken by water pressure.

As the particles, it is preferable to use two or more kinds of particles with different specific gravity with respect to water.

The particles can be made of material that expands when soaked in water.

It is further preferable that the water inflow prevention device of the present invention includes another mesh part on a downstream side of the water, which flows into the communication passage when landing in water on the basis of pressure difference between the inside and around the communication passage, with respect to the former mesh part, to supply the particles into a space defined between the former mesh part and the other mesh part from the container when landing in water.

The former mesh part and the other mesh part can be integrally formed.

In the present invention, the mesh part can be made of material that expands when soaked in water.

The pressure adjusting valve of the present invention has the water inflow prevention device described above.

The aircraft of the present invention has the pressure adjusting valve.

A flow of water, which flows into the communication passage on the basis of pressure difference between atmospheric pressure in the communication passage and water pressure around the communication passage, allows objects, such as broken pieces of an airframe, floating in a place where landing in water, to flow to reach the mesh part to cause the mesh part to be clogged. Accordingly, an inflow of water into the inside of the aircraft through the communication passage can be prevented to enable passengers and crews to have a necessary time to escape outside the aircraft by delaying submersion inside the aircraft.

Providing the container for containing the particles enables the mesh part to be reliably clogged without depending on floating objects.

BRIEF DESCRIPTION OF THE DRAWINGS

FIG. 1B is a longitudinal sectional view showing a range circled by a broken line in FIG. 1A;

DETAILED DESCRIPTION OF THE PREFERRED EMBODIMENTS

Embodiments of the present invention will be described below with reference to accompanying drawings.

Figure 1A:
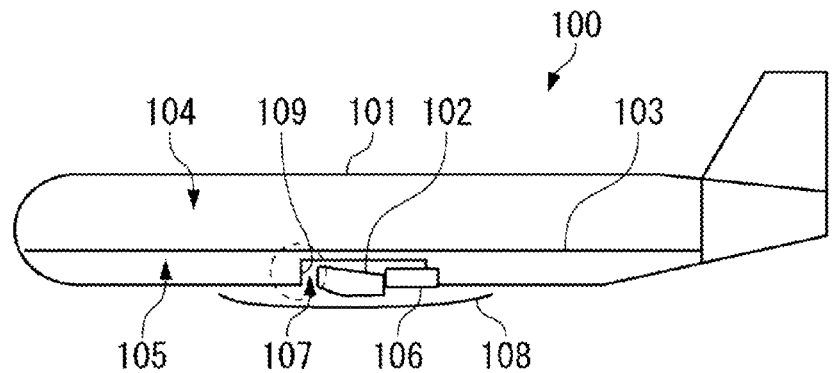
FIG. 1A shows an airframe of an aircraft.

A configuration of an aircraft 100 common to each of the embodiments will be briefly described with reference to FIG. 1A.

The aircraft 100 includes a fuselage 101, and a main wing 102.

A space 104 above a floor 103 installed inside the fuselage 101 (space above a floor) is divided into a cabin, a cockpit, a hold, and the like. The space 104 above the floor and a space 105 below the floor are pressurized by an air conditioning system (not shown) mounted in the aircraft.

The fuselage 101 is provided in its lower portion with a bay 107 in which various accessories, such as a main landing gear 106, are housed, as well as a central portion of the main wing 102 is arranged. The bay 107 is covered with a fairing 108. The inside of the fairing 108 is not pressurized. The inside and outside of the fairing 108 communicate with each other through an opening or a gap.

The bay 107 is divided by a pressure bulkhead 109 (refer to FIG. 1B) that separates a pressurized space inside the aircraft from an external space without being pressurized.

The aircraft 100 includes a pressure adjusting valve 1 (refer to FIG. 1B) that adjusts air pressure in the pressurized space inside the aircraft in a lower portion of the fuselage 101.

The air conditioning system performs air conditioning and pressurization inside the aircraft by using bleed air from an engine (not shown) of the aircraft as a heat source and a pressure source.

Figure 1B:
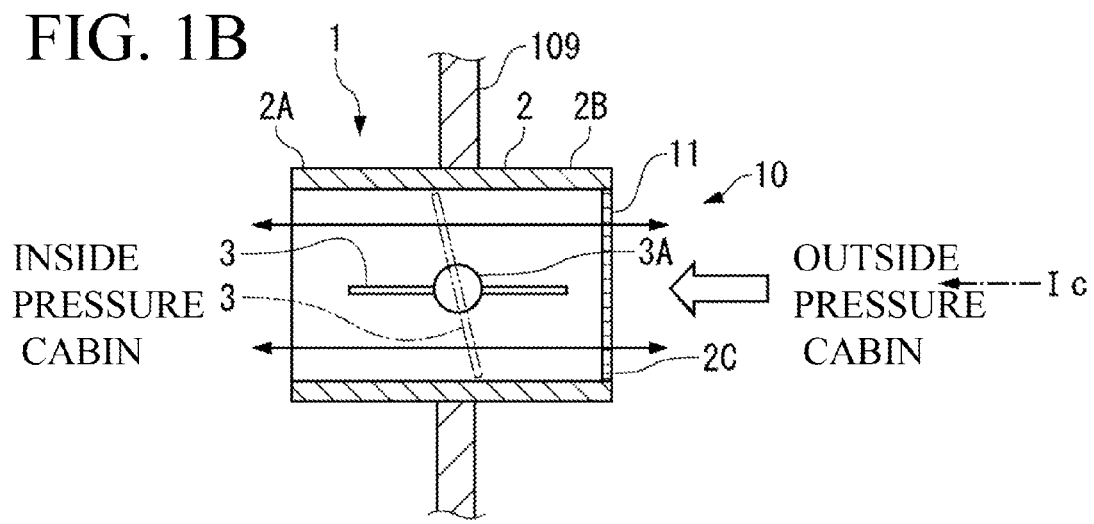
FIGS. 1B and 1C show a water inflow prevention device of a first embodiment provided in a duct of a pressure adjusting valve provided in the airframe.

The air conditioning system adjusts opening of the pressure adjusting valve 1 to maintain the inside of the aircraft within a predetermined range of air pressure. As shown in FIG. 1B by thin arrows, air goes in and out between the inside and outside of the aircraft through the pressure adjusting valve 1.

The pressure adjusting valve 1 includes a duct 2 in a cylindrical shape, allowing the inside of the pressure bulkhead 109 (the inside of the aircraft) and the outside thereof (the outside of the aircraft) to communicate with each other, and a valve element 3 arranged inside the duct 2. The duct 2 horizontally penetrates the pressure bulkhead 109.

The pressure adjusting valve 1 is a butterfly valve in which the valve element 3 turns around a shaft 3A to open and close a flow channel in the duct 2. When the valve element 3 is positioned as shown by a solid line, the pressure adjusting valve 1 is fully opened. The valve element 3 is driven to a position corresponding to opening of the pressure adjusting valve 1 (such as a position shown by a dashed line) by an actuator (not shown).

Various public known valves, such as a shutter valve, are available as the pressure adjusting valve 1.

The duct 2 can be determined in an appropriate shape. For example, an end 2A of the duct 2 inside the aircraft can be formed in a bell mouth shape.

To secure redundancy, a plurality of pressure adjusting valves 1 may be provided in the pressure bulkhead 109.

If the aircraft 100 lands in water in an emergency, the fairing 108 is broken due to a collision with a water surface to cause the lower portion of the fuselage 101 to be submerged. Then, it is necessary to prevent the inside of the aircraft from being submerged by water flowing into the inside thereof through the pressure adjusting valve 1 as shown in FIG. 1B by an open arrow.

At the time, a pilot can perform an operation of closing the pressure adjusting valve 1, however, the operation may be delayed. If the aircraft 100 receives an impact before the emergency landing in water, a control system of the pressure adjusting valve 1 may break down to cause the valve element 3 to fail to operate even if the pilot performs the operation.

Each of the embodiments described below will describe a device capable of preventing an inflow of water into the inside of an aircraft through the pressure adjusting valve 1 even if the valve element 3 fails to operate due to a delay of the operation of closing the pressure adjusting valve 1 or a failure of the control system.

First Embodiment

Figure 1C:
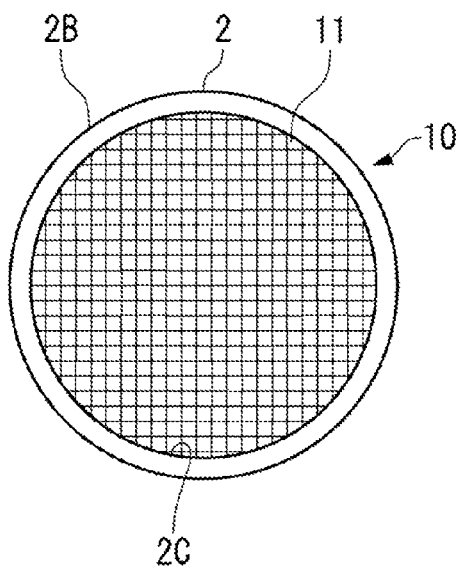

As shown in FIGS. 1B and 1C, a water inflow prevention device 10 in accordance with a first embodiment includes a circular wire mesh 11 that corresponds to a shape of an opening 2C of the duct 2, and that is provided at an end 2B of the duct 2, projecting outside the aircraft.

FIG. 1C shows the water inflow prevention device of FIG. 1B viewed from a direction of Ic. In FIG. 1C, the valve element 3 is not shown. The same applies to other similar drawings.

The wire mesh 11 is formed of thin metallic wire made of aluminum alloy or the like in a mesh-like shape, and is provided at the end 2B in a direction intersecting an axis line of the duct 2 (an orthogonal direction in the present embodiment). For example, the wire mesh 11 can be provided in the duct 2 by attaching an annular frame body to a peripheral portion of the wire mesh 11 so that the frame body is fastened at the end 2B of the duct 2 with a fastener or the like. The wire mesh 11 also can be provided at a position a little behind the end 2B toward the inside of the duct 2 (refer to FIG. 10).

Air going in and out between the inside and outside of the aircraft through the duct 2 passes through a large number of gaps in the wire mesh 11.

Figure 2A:
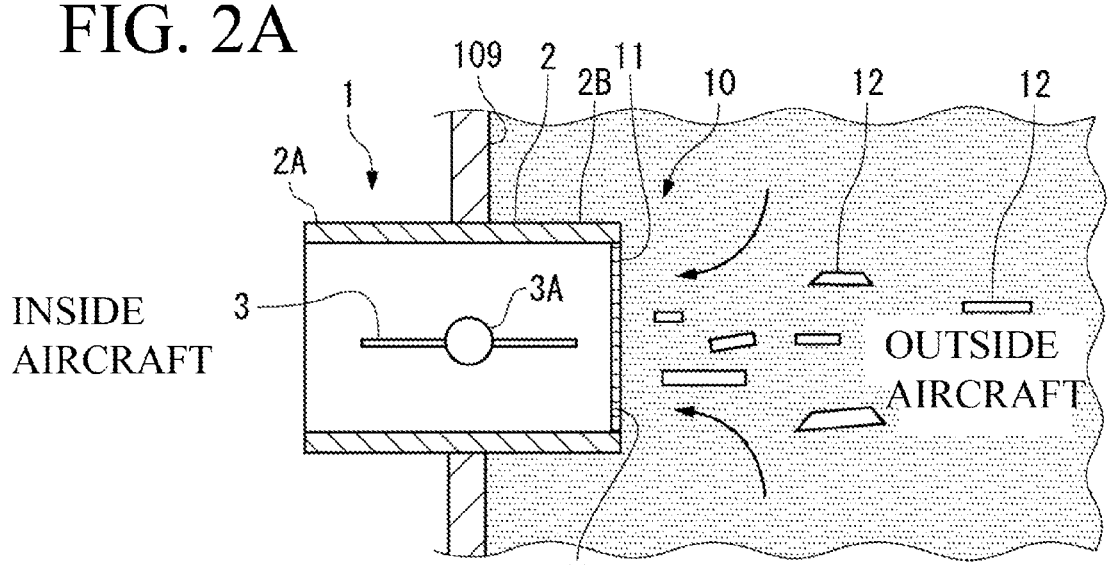
FIGS. 2A to 2C are illustrations to describe a wire mesh of the water inflow prevention device that is clogged by broken pieces of the airframe and the like when landing in water.
Figure 2B:
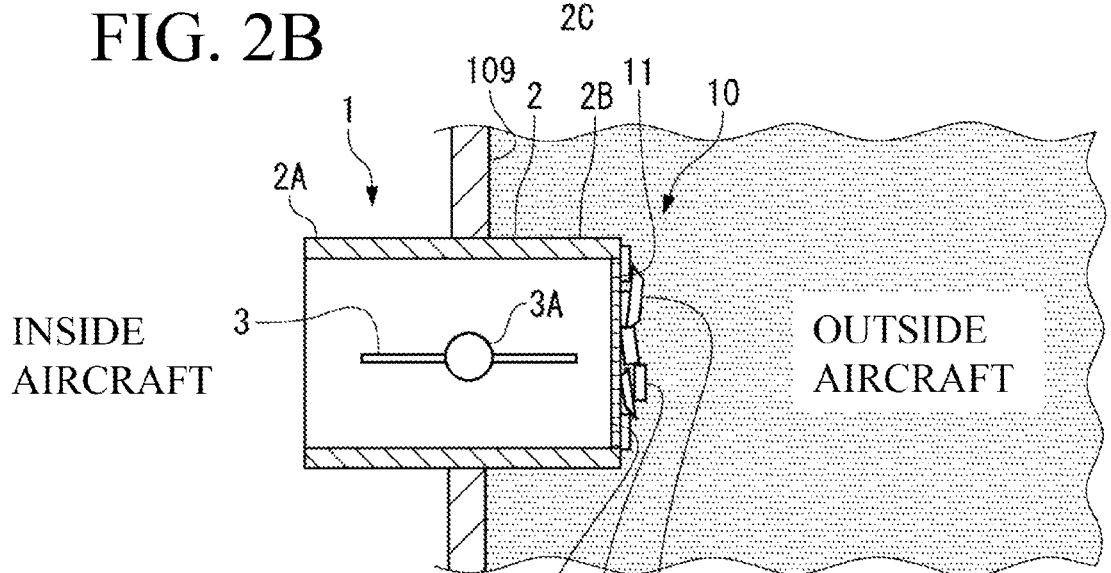
Figure 2C:
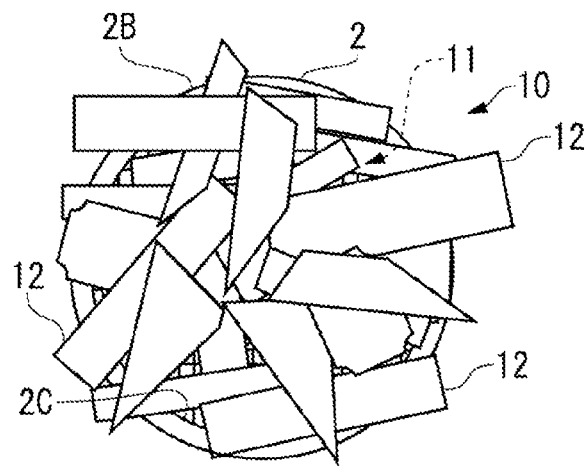

If the aircraft 100 lands in water in an emergency, the fairing 108 is broken as described above, and water reaches around the opening 2C of the duct 2 on a side outside the aircraft. Then, water pressure is always more than atmospheric pressure in the duct 2, so that water around the opening 2C flows into the duct 2 through the opening 2C as shown in FIG. 2A by arrows. A flow of the water allows also floating objects 12, such as broken pieces of the fairing 108, floating in water, to flow toward the opening 2C of the duct 2. When the floating objects 12 are caught by the wire mesh 11 as shown in FIGS. 2B and 2C, the wire mesh 11 is clogged.

The floating objects 12 stick to the wire mesh 11 due to water pressure. Accordingly, an inflow of water into the inside of the aircraft through the pressure adjusting valve 1 is prevented.

In the present specification, prevention of an inflow of water means not only that an inflow of water is completely prevented, but also that the amount of water is reduced even if there is an inflow of water.

The floating objects 12 caught by the wire mesh 11 includes, for example, objects, such as waterweeds, seaweeds, driftwood, and garbage, floating in a place where landing in water, other than broken pieces of an airframe (fairing 108).

Even if the space 105 below the floor is gradually submerged due to water flowing into the inside of the aircraft through portions other than the pressure adjusting valve 1, such as a part of the airframe broken at the time of an emergency landing in water, and a portion at which members are joined to each other, the water inflow prevention device 10 blocks the opening 2C of the duct 2 to enable reducing a speed of submersion. As a result, it is possible to secure a necessary time to allow passengers and crews to escape outside the aircraft.

The water inflow prevention device 10 of the present embodiment only includes the wire mesh 11 that is clogged by a part of broken pieces of the airframe that is broken immediately after landing in water and objects existing at a place where landing in water to enable preventing an inflow of water into the inside of the aircraft at the time of an emergency landing in water.

Thus, the water inflow prevention device 10 can be reduced in weight as compared with a configuration for the same purpose, including a sensor for detecting water around the pressure adjusting valve 1, an electromagnetic valve that blocks the opening 2C of the duct 2 by receiving a detection signal of water from the sensor, and wiring that connects the sensor and the electromagnetic valve to each other.

The water inflow prevention device 10 of the present embodiment also has a low possibility of breaking down even if receiving an impact, as compared with such an electrical device. As a result, the water inflow prevention device 10 can be reliably operated at the time of an emergency landing in water.

Using an electrical device requires regular maintenance in which repair or replacement may be performed. In contrast, once the water inflow prevention device 10 is provided in an airframe, the airframe as it is can reach the end of its life without requiring maintenance.

The present embodiment shows a position in the airframe at which the pressure adjusting valve 1 is provided, as only an example, and the pressure adjusting valve 1 can be provided in an appropriate partition wall that separates a pressurized space and an external space (such as a pressure bulkhead provided in a rear portion of the fuselage 101).

The water inflow prevention device 10 is capable of preventing an inflow of water into the inside of the aircraft through the duct 2 regardless of a direction of the installed duct 2.

In the present embodiments, the opening 2C of the duct 2 faces rearward (toward a tail assembly), but conversely, the opening 2C of the duct 2 may face frontward (toward a nose), upward, or downward. In each case, as with the description above, a flow of water flowing into the duct 2 on the basis of pressure difference between atmospheric pressure and water pressure allows the floating objects 12 to reach and clog the wire mesh 11 to enable preventing an inflow of water into the inside of the aircraft.

Figure 3A:
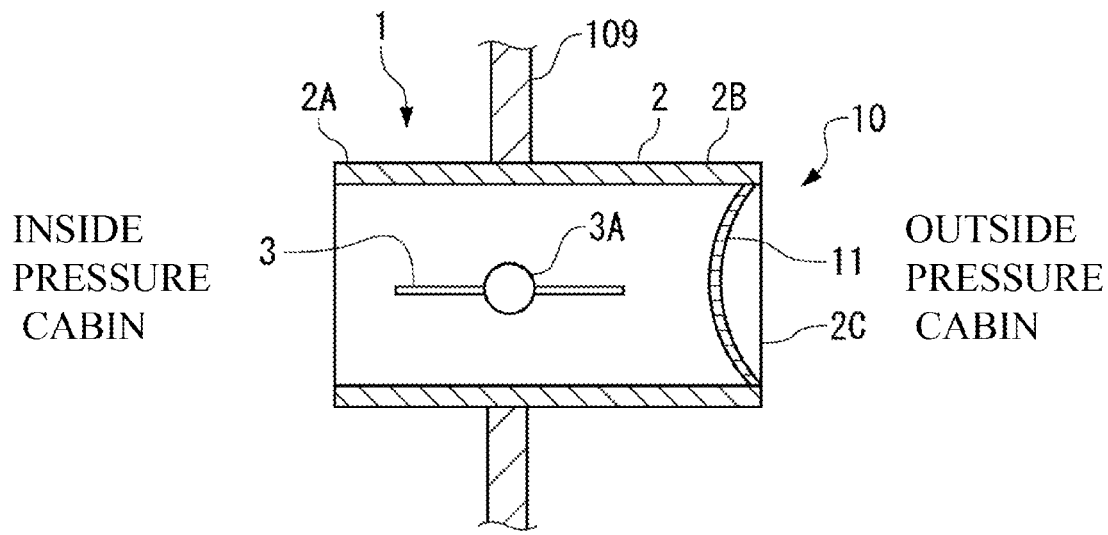
FIGS. 3A and 3B show respective variations of the wire mesh.
Figure 3B:
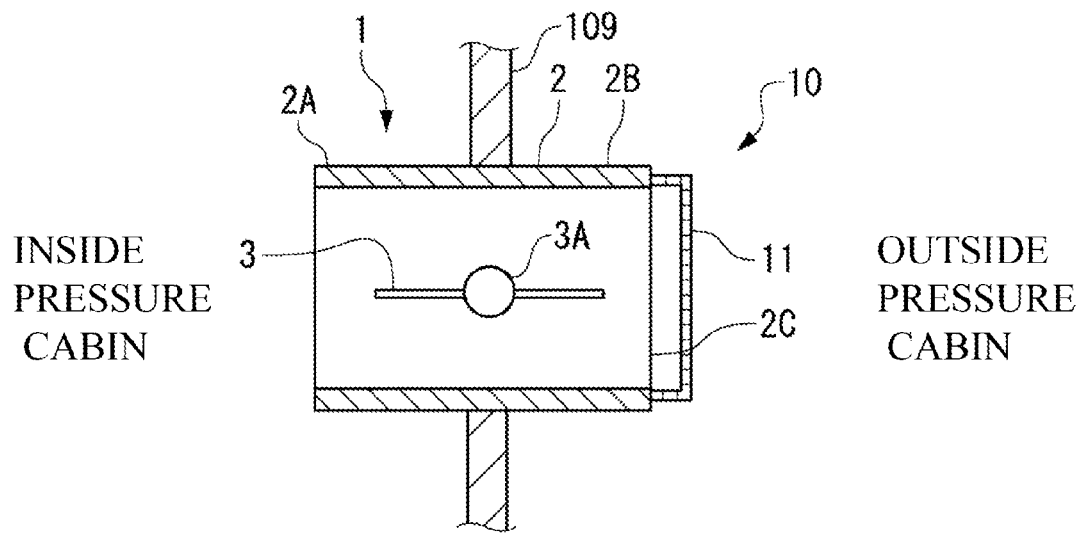

The wire mesh 11 is not always required to be formed in a flat shape, and thus may dent toward the inside of the duct 2 as shown in FIG. 3A, or conversely may project with respect to the end 2A of the duct 2 to project toward the outside of the aircraft as shown in FIG. 3B.

When the wire mesh 11 is positioned at or near the end 2B of the duct 2 facing the outside of the aircraft as shown in FIGS. 1B, 3A, and 3B, a gap between the floating objects 12 reaching the wire mesh 11, which are too large to easily enter inside the duct 2, and the opening 2C, is filled with the floating objects 12, which are small enough to easily enter inside the duct 2. Thus, using difference in size among the floating objects 12 enables the wire mesh 11 to be reliably and rapidly clogged.

Not only the wire mesh 11, but also an appropriate mesh part with rigidity allowing the mesh part to bear force of water passing through the mesh part when landing in water to receive the floating objects 12 is available. The mesh part can be made of resin material or fiber-reinforced resin, for example. In that case, wires constituting the mesh can be integrally molded.

Figure 4A:
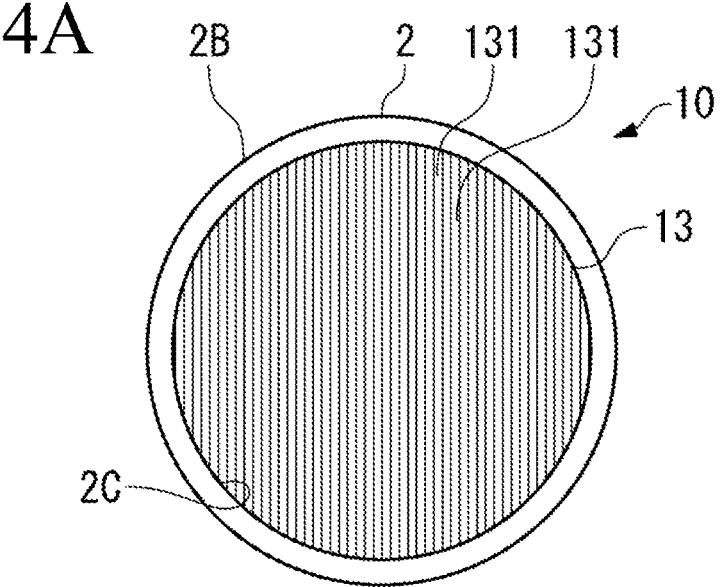
FIGS. 4A and 4B show the respective variations of the wire mesh.

In addition, not only the wire mesh 11 formed in a two-dimensional lattice pattern, but also a member 13 composed of straight lines 131 arranged parallel in one direction, as shown in FIG. 4A, is available to the water inflow prevention device 10. The "mesh part" in the present specification includes this kind of member 13.

Figure 4B:
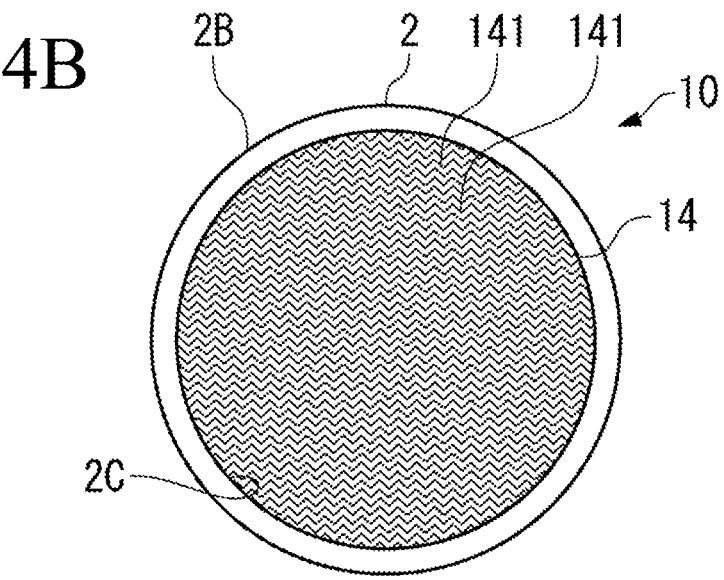

Further, as shown in FIG. 4B, a mesh-like member 14 can be formed of wavy wire 141. The wavy wire 141 easily catches the floating objects 12 to hold them.

Second Embodiment

Next, a second embodiment of the present invention will be described with reference to FIGS. 5 and 6.

A different matter from the first embodiment will be mainly described below.

In the second embodiment, particles 15 with which the wire mesh 11 is clogged are provided in preparation for landing in water.

Figure 5A:
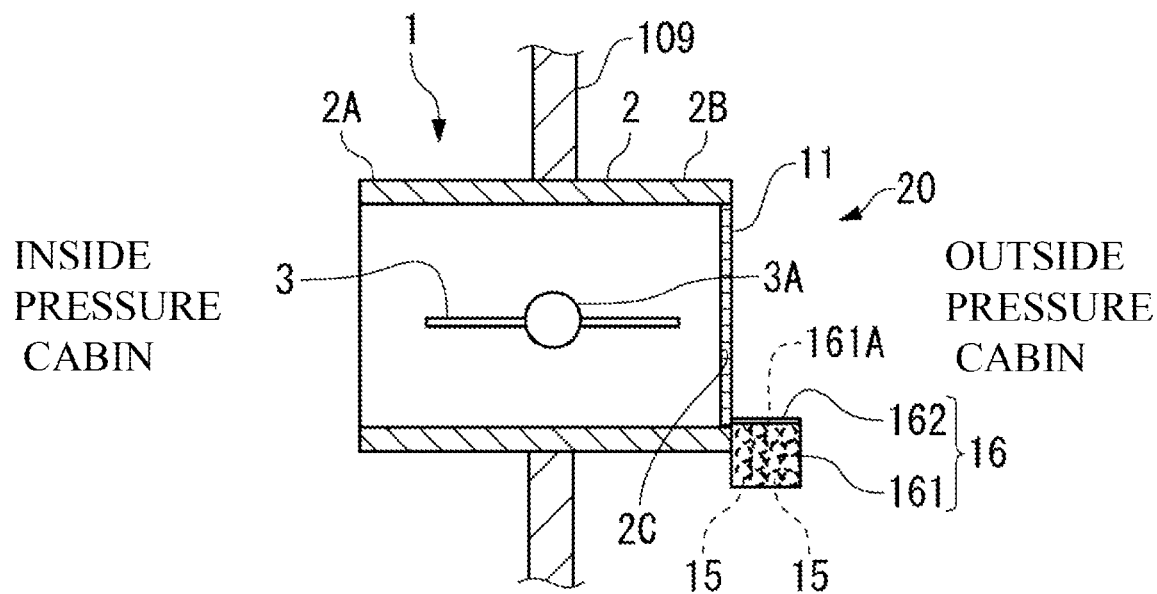
FIGS. 5A and 5B show a water inflow prevention device of a second embodiment.
Figure 5B:
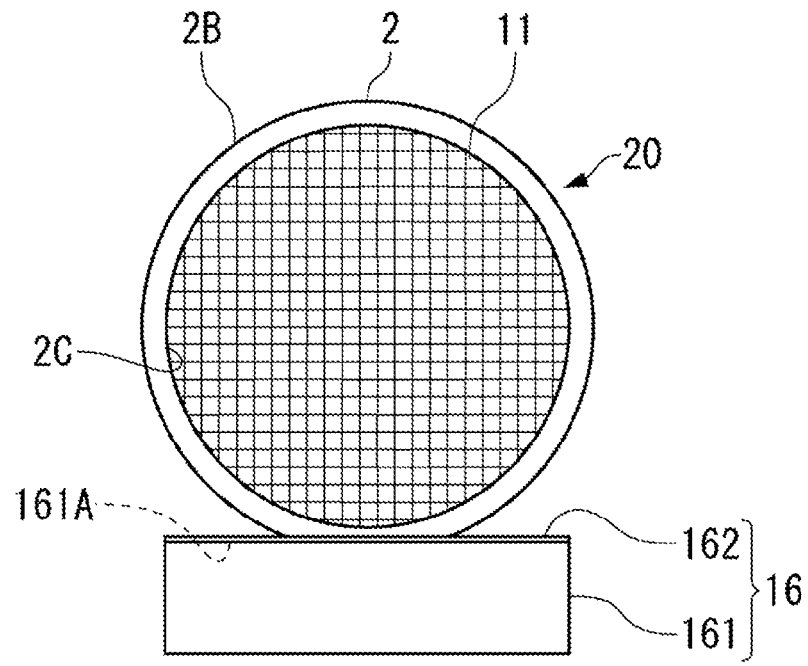

As shown in FIGS. 5A and 5B, a water inflow prevention device 20 of the second embodiment includes the wire mesh 11, and a container 16 that contains a large number of particles 15 that can flow under water along with the water.

Density of the particle 15 is set to be similar to density of water. Accordingly, the particle 15 flows with a flow of the water without rising or lowering much under the water.

A variety of resin materials are available as the particle 15. For example, the particle 15 can be made of resin material with specific gravity a little more or less than that of water, such as polyethylene, polypropylene, polystyrene, nylon, or acrylic.

The container 16, as shown in FIGS. 5A and 5B, includes a box shaped container body 161 whose upper part is opened, and a lid 162 that seals an opening 161A of the container body 161.

The container body 161 is provided at a lower edge of the end 2B of the duct 2 with a bracket (not shown). The opening 161A of the container body 161 is positioned immediately below the wire mesh 11. As shown in FIG. 5B, a width of the container body 161 can be set at the same size as a diameter of the opening 2C of the duct 2.

The lid 162 formed in a film shape seals the container body 161 containing the particles 15 from the opening 161A. Accordingly, the particles 15 are held in the container 16 without coming out from the container 16 due to air blowing out from the opening 2C of the duct 2 and vibration of the airframe.

The lid 162 holds the inside of the container 16 in an airtight manner to prevent deterioration of the particle 15 (such as a crack) caused by exposure to gas contained in air. Other than that, the lid 162 also may be formed in a mesh-like shape with air permeability.

The lid 162 is joined to a peripheral portion of the opening 161A of the container body 161 by an appropriate method, such as adhesive, or crimping, for example.

The lid 162 is formed of a water-soluble film made of cellulose or the like, for example, and dissolves when soaked in water at the time of an emergency landing in water.

Figure 6A:
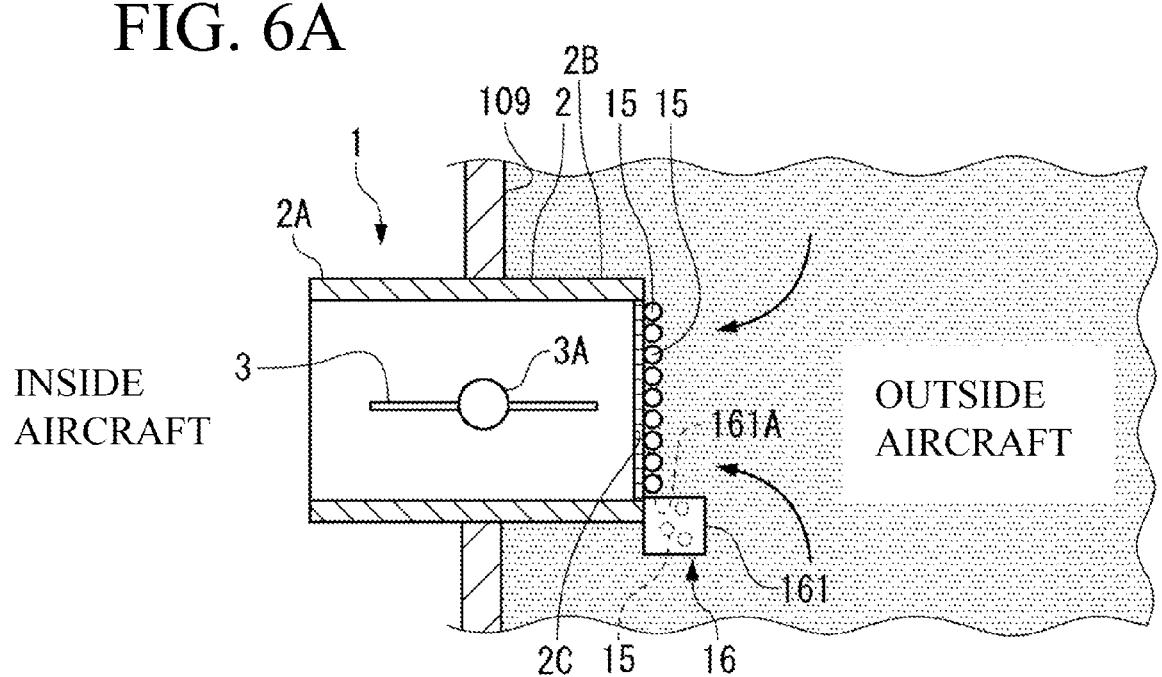
FIGS. 6A and 6B show a wire mesh that is clogged by particles discharged from a container of the water inflow prevention device of the second embodiment.
Figure 6B:
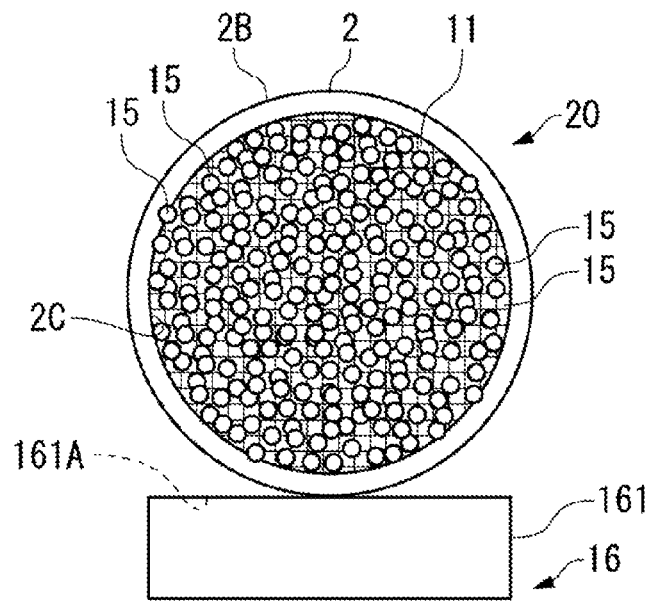

Thus, as shown in FIGS. 6A and 6B, the opening 161A of the container body 161 is opened at the time of an emergency landing in water.

As described above, when water around the duct 2 flows into the duct 2 on the basis of pressure difference between atmospheric pressure in the duct 2 and water pressure, a flow of the water allows the particles 15 to be released from the container body 161, and then the particles 15 flow toward the opening 2C to be caught by the wire mesh 11.

Not only the particles 15, but also the floating objects 12 existing at a place where landing in water are caught by the wire mesh 11.

Even if a large number of particles 15 are concentrated at a specific area (such as a central portion) of the wire mesh 11, one of the particles 15 clogs one of gaps 11A (meshes) of the wire mesh 11, and subsequently water passing through one of the gaps 11A adjacent to it allows one of the particles 15 to clog the adjacent gap 11A. This action continuously occurs to result in dispersing the particles 15.

In terms of sufficiently preventing water inflow even if landing in fresh water or seawater, it is also preferable to use a first particle 15 with the same density as that of the fresh water to allow the first particle 15 to flow along with a flow of the fresh water, as well as a second particle 15 with the same density as that of seawater to allow the second particle 15 to flow along with a flow of the seawater with density more than that of the fresh water.

The present embodiment enables the particles 15 provided in the container 16 to clog the wire mesh 11, and thus, even if there is no suitable floating object 12 at a place where landing in water, or there is an insufficient amount of floating object 12 to clog throughout the wire mesh 11, it is possible to reliably prevent an inflow of water into the inside of the aircraft through the duct 2.

A shape of the container 16 can be appropriately determined.

Figure 7A:
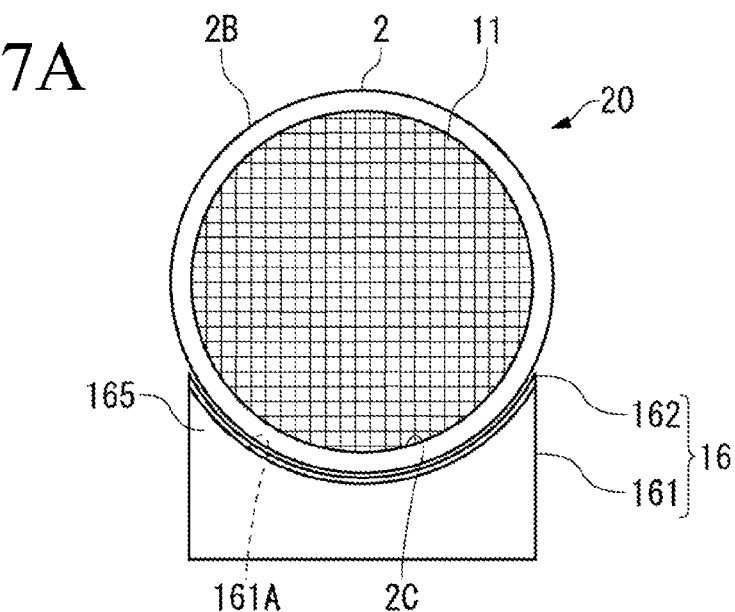
FIGS. 7A to 7C show a variation of the container.
Figure 7B:
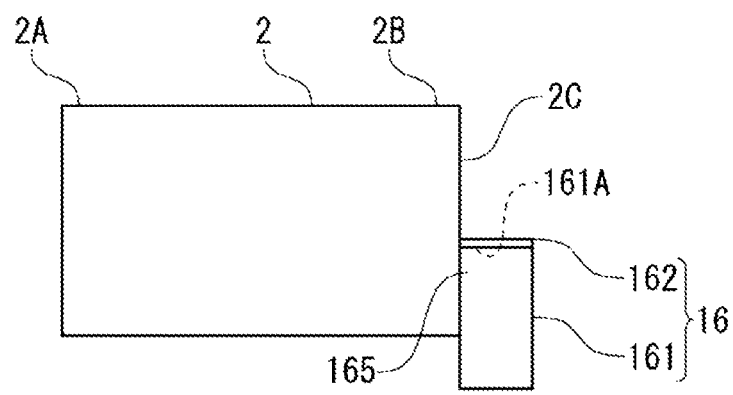

For example, as shown in FIGS. 7A and 7B, extending a wall of the container body 161 to near the opening 2C enables a guide wall 165 to be formed. The guide wall 165 allows the particles 15 in the container 16 to be guided to the opening 2C.

Figure 7C:
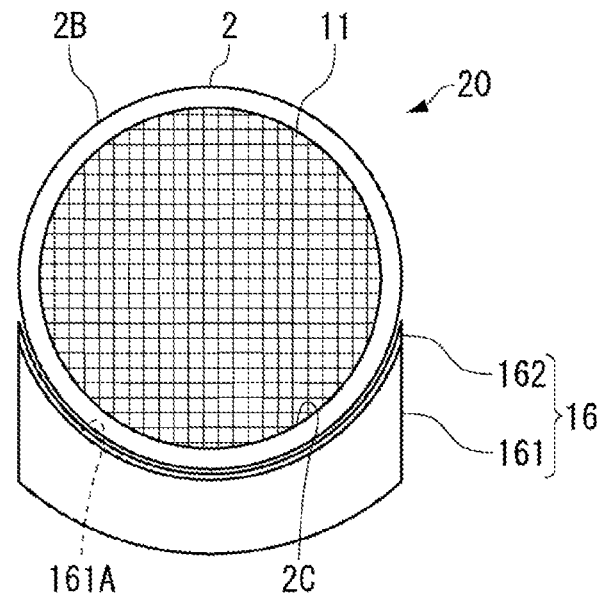

As shown in FIG. 7C, the container body 161 also can be formed in an arc-like shape along an outer peripheral portion of the duct 2.

As far as a flow of water flowing into the duct 2 at the time of an emergency landing in water allows the particles 15 to flow toward the wire mesh 11, a position at which the container 16 is provided, a position of the opening 161A of the container 16, and specific gravity of the particle 15, can be appropriately determined.

Figure 8A:
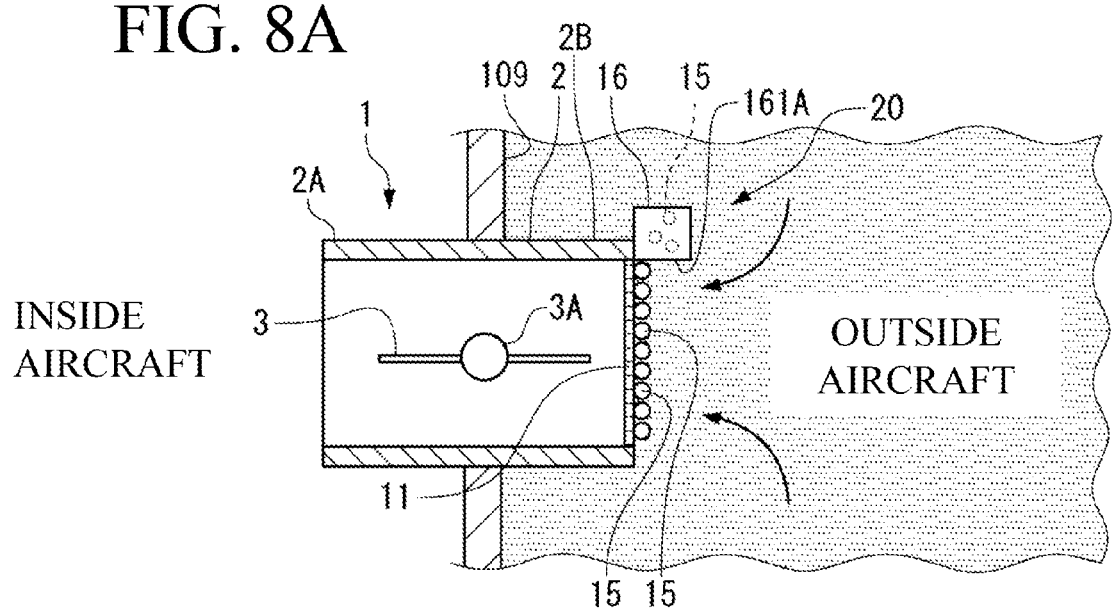
FIGS. 8A and 8B show respective variations of the second embodiment.

For example, in an example shown in FIG. 8A, the container 16 is provided at an upper edge of the end 2B of the duct 2, and the opening 161A of the container 16 faces downward.

Figure 8B:
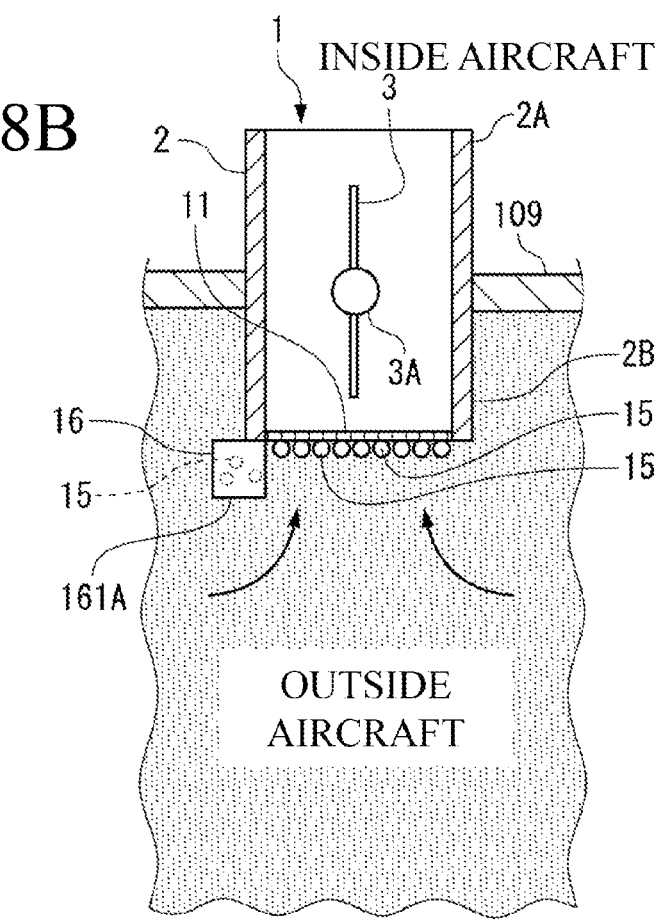

In addition, in an example shown in FIG. 8B, the duct 2 is provided while its opening 2C faces downward, and the opening 161A of the container 16 also faces downward.

In each of cases shown in FIGS. 8A and 8B, the container 16 is positioned on an upstream side of a flow of water, which flows into the duct 2 when landing in water, with respect to the wire mesh 11. Accordingly, a flow of water flowing into the duct 2 allows the particles 15 in the container 16 to flow so as to be drawn to the wire mesh 11, and thus the particles 15 can clog the wire mesh 11.

A size of the particle 15 can be appropriately determined as far as allowing the particle 15 to enter the opening 2C of the duct 2 and clog the wire mesh 11.

Figure 9A:
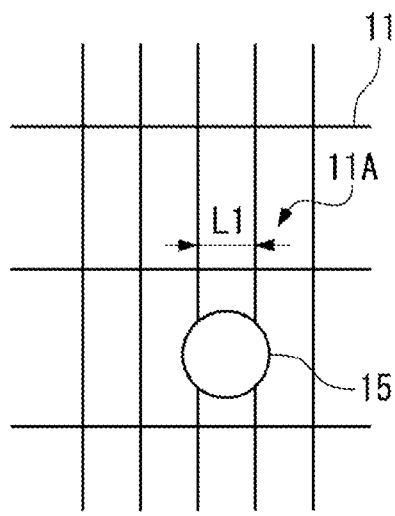
FIGS. 9A and 9B show gaps of the wire mesh and a particle.

In an example in which the gap 11A of the wire mesh 11 is formed into a rectangle as shown in FIG. 9A, a diameter of the particle 15 should be more than a length L1 of a short side of the gap 11A.

Figure 9B:
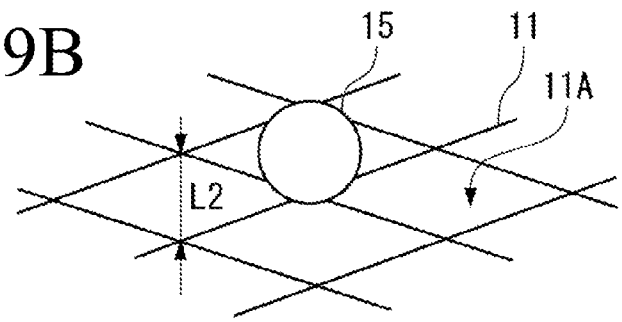

In addition, in an example in which the gap 11A of the wire mesh 11 is formed into a lozenge as shown in FIG. 9B, a diameter of the particle 15 should be more than a length L2 of a shorter diagonal line of the gap 11A.

Figure 9C:
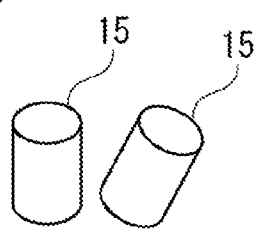
FIGS. 9C and 9D show respective examples of a shape of the particle.
Figure 9D:
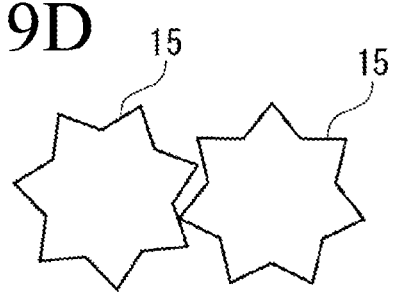

A shape of the particle 15 also can be set to an appropriate shape other than a sphere described above, such as a circular cylinder shown in FIG. 9C, or a shape with a plurality of protrusions on its surface as shown in FIG. 9D.

A shape and size of each of the particles 15 contained in the container 16 is not required to be identical.

To reduce cost, also crushed resin pieces to be used as material of resin molding are available as the particles 15.

Not only the lid 162 of the container 16, but also all of the container 16 including the container body 161 can be made of water-soluble material.

The container 16 is not always required to include the lid 162. For example, a water-soluble bag is available as the container 16.

A member that is broken by water pressure is available for only the lid 162 of the container 16 or for the entire container 16. When the container 16 is opened by water pressure, the particles 15 are released from the container 16.

As above, it is enough that at least a part of the container 16 includes any one of characteristics of dissolving in water and of being broken by water pressure. Specifically, a member containing cellulose (such as paper) is available for at least a part of the container 16.

Figure 10:
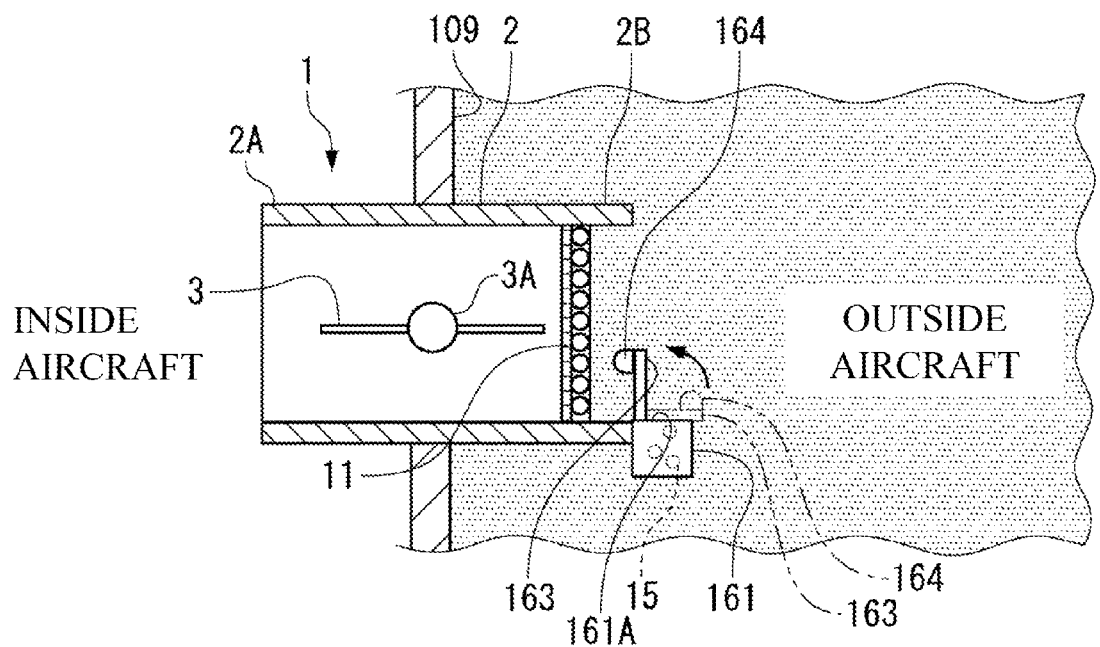
FIG. 10 shows a variation of the second embodiment.

To open the container 16 when landing in water, as shown in FIG. 10, a float 164 that floats under water also can be attached to a lid 163 in a plate shape. The lid 163 attached to the container body 161 in one end thereof closes the opening 161A of the container body 161 by self-weight of the lid 163 in a normal period. The lid 163 is lifted by buoyancy acting on the float 164 when landing in water to open the container 16.

Third Embodiment

Subsequently, with reference to FIG. 11A, a third embodiment of the present invention will be described.

Figure 11A:
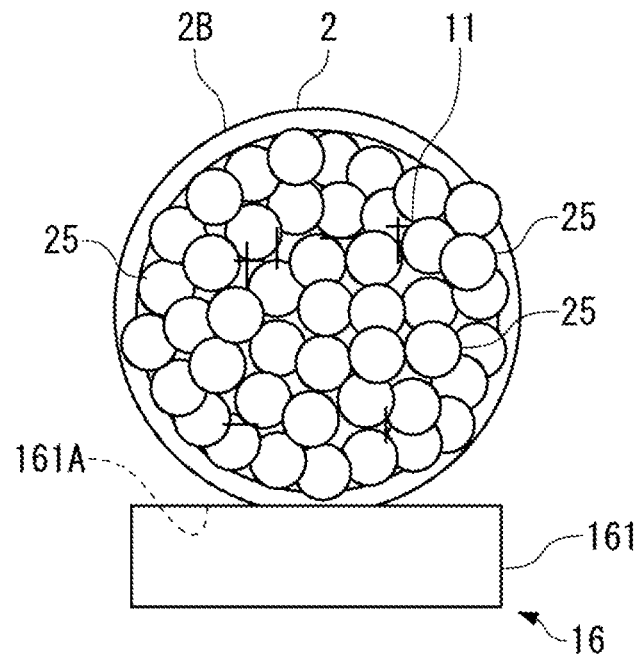
FIG. 11A shows a wire mesh that is clogged by water-swelling particles discharged from a container of a water inflow prevention device of a third embodiment.

In the third embodiment, as shown in FIG. 11A, particles 25 are made of material that expands when soaked in water.

As the particle 25, for example, a high water-absorbing polymer material of sodium polyacrylic polymer or the like is available.

As with the particle 15 of the second embodiment, appropriate specific gravity is applied to each of the particles 25, and the particles 25 are contained in the container 16 in a normal period. To prevent the particles 25 from absorbing moisture to expand in the container 16, it is preferable that the lid 162 described above (refer to FIG. 5B) seals the container 16 in an airtight manner.

Even if the container 16 is not sealed in an airtight manner, dry air inside the aircraft flowing out through the duct 2 flows around the container 16 to tend to easily maintain the inside of the container 16 in a dry state. As a result, it is possible to prevent the particles 25 from expanding in the container 16.

As with the second embodiment, when the lid 162 is dissolved in water or broken by water pressure at the time of an emergency landing in water, along with a flow of water flowing into the duct 2, the particles 25 in the container 16 comes out from the container 16 to the outside of the container 16. Then, each of the particles 25 reaches the wire mesh 11 while expanding by absorbing water that is a few tens to a thousand times heavier than self-weight of the particle 25, for example.

It is preferable that speed of water absorption of the particle 25 is appropriately set so that the particle 25 remarkably expands after smoothly coming out from the container 16.

The present embodiment allows gaps of the wire mesh 11 and gaps between the particles 25 to be filled with the particles 25 expanded by water absorption to enable the wire mesh 11 to be sufficiently clogged.

Even if only one of the particles 25 reaches the wire mesh 11, a plurality of gaps of the wire mesh 11 can be clogged. Accordingly, even if a part of groups of the particles coming out from the container 16 accidentally flows toward a direction deviating from the wire mesh 11, remainders of the particles 25 can sufficiently clog the wire mesh 11.

Using the particle 25 that expands when soaked in water reduces a total number of the particles 25 required to clog the entire wire mesh 11 as compared with a case where it is assumed that the particle 25 does not expand. Thus, a total weight of the particles 25 in a dry state in a normal period, as well as a weight of the container 16 with a volume required for containing the particles 25 can be reduced to contribute to weight reduction of the aircraft.

To apply a characteristic of expanding when soaked in water (hereinafter referred to as water-swelling) to the particle 25, the particle 25 can be not only made of a water-swelling material, but also formed by applying a coat made of a water-swelling material to a particle made of any material.

Instead of applying water-swelling to the particle 25, or in addition to the particle 25, the water-swelling also can be applied to a mesh part.

Figure 11B:
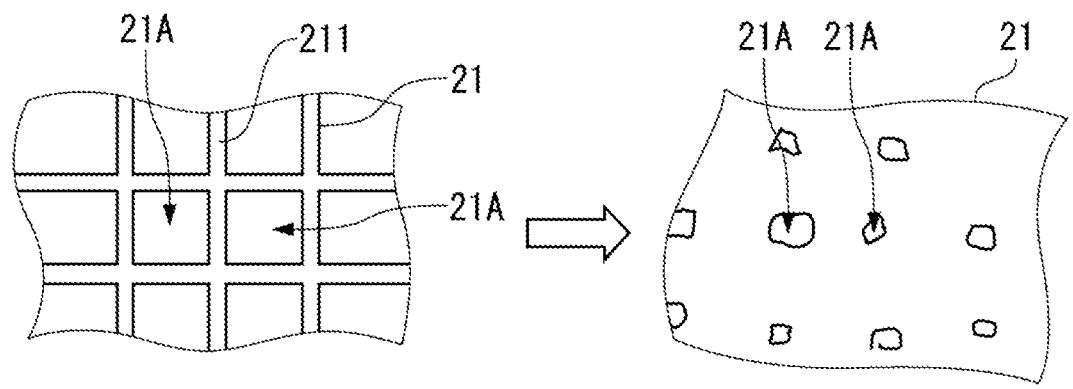
FIG. 11B shows a surface of the wire mesh, in which a water-swelling coat is formed.

In a surface of a wire mesh 21 shown in FIG. 11B, a coat 211 made of a water-swelling resin material (such as a paint film) is formed. Once the wire mesh 21 is soaked in water when landing in the water, the coat 211 is soaked in water to expand to clog a gap 21A of the wire mesh 21 or to at least narrow the gap 21A.

If the gap 21A is narrowed, the wire mesh 21 can be easily clogged.

To apply water-swelling to a mesh part, the mesh part can be made of a water-swelling material.

Fourth Embodiment

Figure 12:
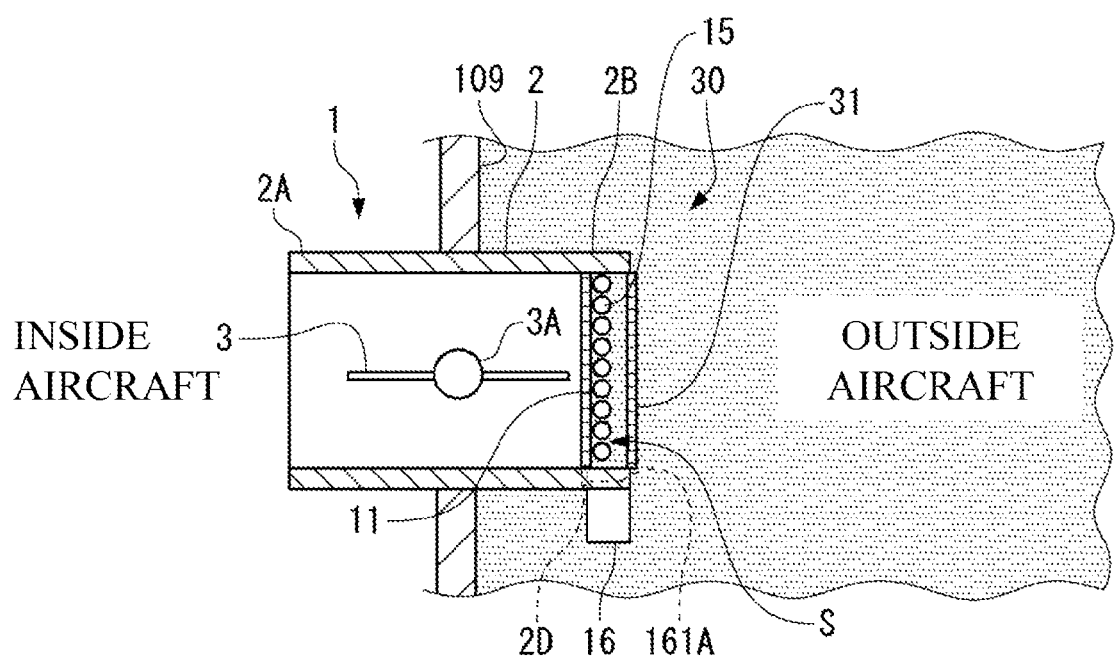
FIG. 12 shows a section between wire meshes, into which particles are supplied from a container of a water inflow prevention device of a fourth embodiment.

Subsequently, with reference to FIG. 12, a fourth embodiment of the present invention will be described.

A water inflow prevention device 30 of the fourth embodiment includes the wire mesh 11 provided at a position a little behind the end 2B of the duct 2 toward the inside of the duct 2, a wire mesh 31 provided at the end 2B of the duct 2, and the container 16 containing the particles 15 that are to be supplied into a space S defined between the wire meshes 11 and 31 when landing in water.

The container 16 is provided at the bottom of an outer peripheral portion of the duct 2 near the end 2B thereof.

Then, the container 16 is formed in an arc-like shape along the outer peripheral portion of the duct 2 (refer to FIG. 7C).

The duct 2 is provided with an opening 2D that penetrates in a thickness direction of the duct 2 between the wire meshes 11 and 31, and that is formed along a circumferential direction of the duct 2 by a length corresponding to a length of the opening 161A of the container 16. Through the opening 2D, the inside of the container 16 and the space S communicate with each other when landing in water.

Once the lid 162 of the container 16 is dissolved in water or broken by water pressure when landing in water, a flow of water flowing into the duct 2 allows the particles 15 to be released from the container 16 to the space S between the wire meshes 11 and 31. At this time, the wire mesh 31 prevents the particles 15 from flowing out in a direction away from the wire mesh 11 to allow the particles 15 to stay in the space S. As a result, using the particles 15 in the container 16 without waste enables the wire mesh 11 to be sufficiently clogged.

The wire mesh 31 can be formed, as with the wire mesh 11, or material and a size of a gap of the wire mesh 31 may be different from those of the wire mesh 11.

The wire mesh 11 and the wire mesh 31 are not always required to be separated, and thus can be integrally formed.

As far as the wire mesh 31 is positioned on an upstream side of a flow of water flowing into the duct 2 with respect to the wire mesh 11 that catches the particles 15, each of the wire meshes 11 and 31 can be provided at an appropriate place according to the position relationship.

Figure 13A:
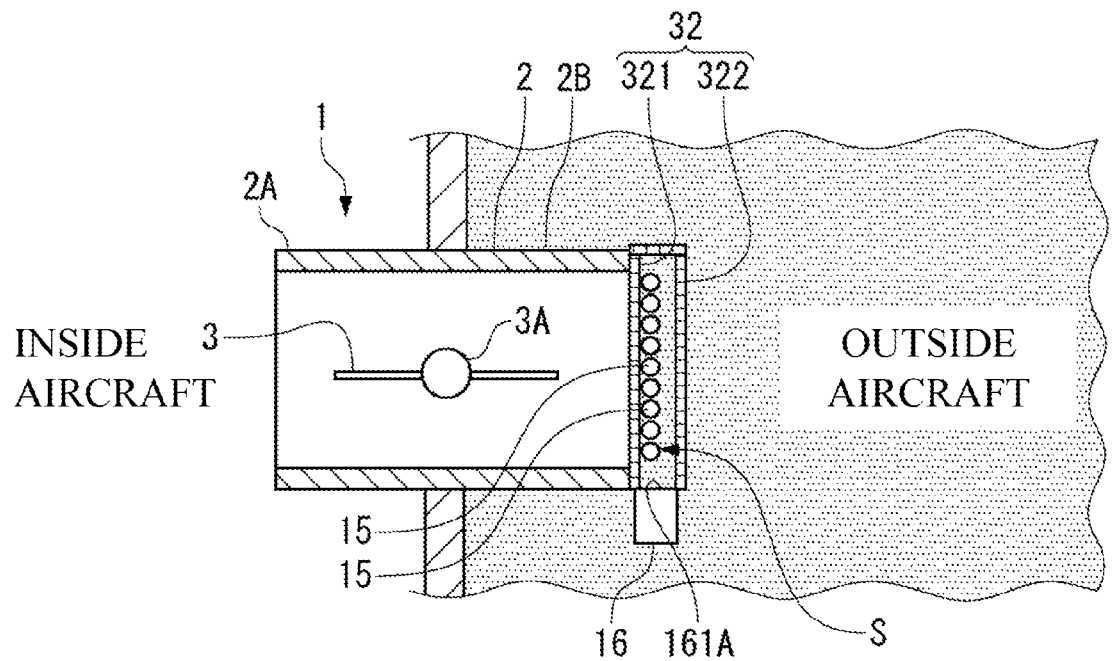
FIGS. 13A and 13B show a water inflow prevention device provided with a wire mesh basket.
Figure 13B:
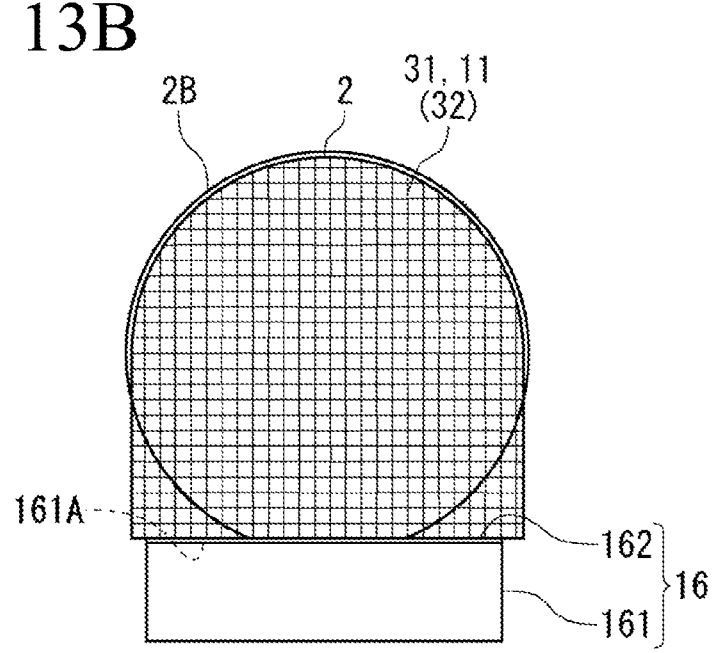

An example shown in FIGS. 13A and 13B uses a wire mesh basket 32 that includes a section 321 corresponding to the wire mesh 11 described above, and a section 322 corresponding to the wire mesh 31 described above.

As shown in FIG. 13A, the wire mesh basket 32 is provided at an end face of the duct 2 facing the outside of the aircraft, and is connected to an upper end of the container 16 as shown in FIG. 13B. As another aspect, the wire mesh basket also can be extended downward so as to house the entire container 16.

Once the lid 162 of the container 16 (refer to FIG. 13B) is dissolved in water or broken by water pressure when landing in water, as with the description above, the particles 15 in the container 16 are released into the space S defined by the wire mesh basket 32. Accordingly, using the particles 15 staying in the space S by using the wire mesh basket 32 without waste enables the wire mesh 11 to be more sufficiently clogged.

Figure 14A:
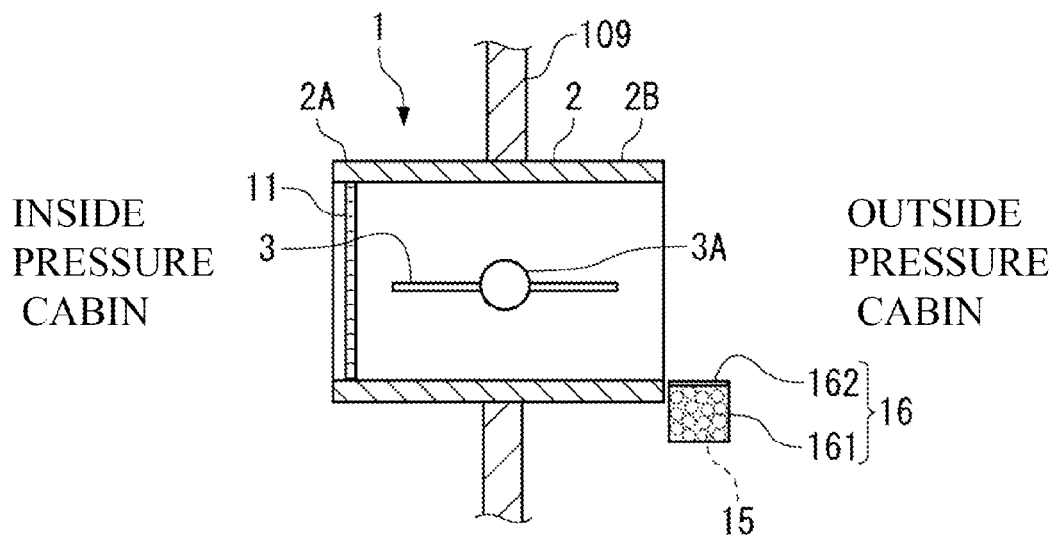
FIG. 14A shows an example in which a wire mesh is provided closer to the inside of the aircraft than a valve element of a pressure adjusting valve.

In addition to the configurations of the embodiments described above, the configurations may be also freely selected or appropriately changed into other configurations without departing from the gist of the present invention. Unlike each of the embodiments above, as shown in FIG. 14A, the wire mesh 11 also can be provided at the end 2A of the duct 2 on a side inside the aircraft. In that case, the floating objects 12 flowing into the duct 2 along with water, and the particles 15, pass through the valve element 3 to reach the wire mesh 11 to enable the wire mesh 11 to be clogged.

Figure 14B:
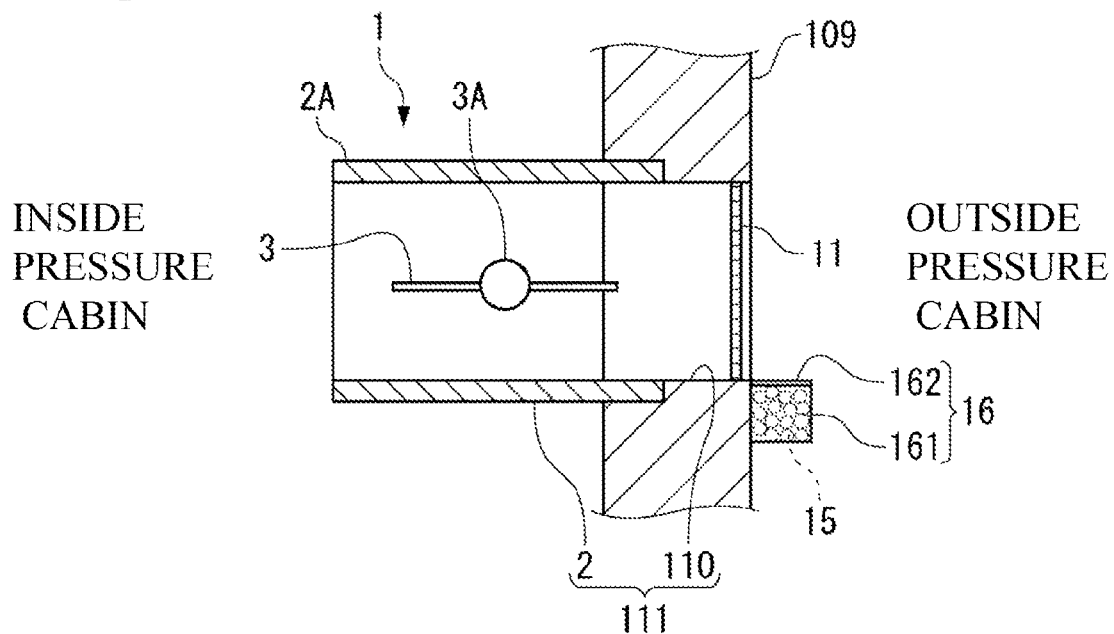
FIG. 14B is a longitudinal sectional view showing a variation of the present invention.

As shown in FIG. 14B, the duct 2 does not sometimes project outside the aircraft across a pressure bulkhead 109. In an example of FIG. 14B, the duct 2 is connected to a ventilation opening 110 formed in the pressure bulkhead 109 from the inside of the aircraft. In this example, the duct 2 and the ventilation opening 110 allow the inside and outside of the aircraft to communicate with each other to form a flow channel 111 in which the valve element 3 of the pressure adjusting valve 1 is positioned.

In that case, the wire mesh 11 and the container 16 can be provided in the pressure bulkhead 109 that is a member forming an end of the flow channel 111 facing the outside of the aircraft.

The water inflow prevention device described in each of the embodiments above is also widely applicable to a valve and an opening, into which water may flow when an aircraft lands in water, other than the pressure adjusting valve.

Selected Figure: FIG. 1

What is claimed is:

1. An aircraft including:
an aircraft fuselage;
a communication passage that penetrates the aircraft fuselage; and
a water inflow prevention device comprising:
a mesh part provided in the communication passage, wherein a fluid flowing through the communication passage passes through the mesh part, and the mesh part is configured to prevent an inflow of water through the communication passage into the aircraft when the aircraft lands in water.

2. The aircraft according to claim 1, wherein the communication passage is a flow channel in which a valve element of a pressure adjusting valve for adjusting air pressure in the aircraft is positioned.

3. The aircraft according to claim 1, further comprising:
a container, wherein the container contains particles and is opened when the aircraft lands in water,
wherein the container is mounted in a vicinity of the communication passage.

4. The aircraft according to claim 1, wherein the mesh part is a wire mesh, and the wire mesh is formed of thin metallic wire in a mesh-like shape.

5. The aircraft according to claim 1, wherein the mesh part is provided so as to intersect an axis line of the communication passage.

6. A water inflow prevention device comprising:
a mesh part provided in a communication passage, wherein a fluid flowing through the communication passage passes through the mesh part; and
a container that contains particles and that is opened when landing in water,
wherein the container is mounted at a peripheral portion of the communication passage, wherein the particles are configured to prevent an inflow of water through the communication passage into an aircraft when the aircraft lands in water.

7. The water inflow prevention device according to claim 6, wherein the container is positioned on an upstream side of a flow of water, which flows into the communication passage when landing in water on the basis of pressure difference between the inside and around the communication passage, with respect to the mesh part.

8. The water inflow prevention device according to claim 6, wherein at least a part of the container has a characteristic of dissolving in water.

9. The water inflow prevention device according to claim 6, wherein at least a part of the container has a characteristic of being broken by water pressure.

10. The water inflow prevention device according to claim 6, wherein two or more kinds of particles with different specific gravity with respect to water are used for the particles.

11. The water inflow prevention device according to claim 6, wherein the particles are made of a material that expands when soaked in water.

12. The water inflow prevention device according to claim 6, wherein the particles are made of a resin material.

13. The water inflow prevention device according to claim 6, further comprising:
another mesh part on a downstream side of the water, which flows into the communication passage when landing in water on the basis of pressure difference between the inside and around the communication passage, with respect to the former mesh part,
wherein the particles are supplied into a space defined between the former mesh part and the other mesh part from the container when landing in water.

14. The water inflow prevention device according to claim 6, wherein the particles include a coating made of a high water-absorbing polymer material.

15. The water inflow prevention device according to claim 6, wherein the particles are made of a high water-absorbing polymer material.

16. The water inflow prevention device according to claim 15, wherein the high water-absorbing polymer material is a sodium polyacrylic polymer.

17. An aircraft comprising:
an aircraft fuselage;
a mesh part provided in a communication passage that penetrates the aircraft fuselage, wherein a fluid flowing through the communication passage passes through the mesh part,
wherein the mesh part is at least partially coated by a material coating made of a material that expands when soaked in water, wherein the coating is configured to prevent an inflow of water through the communication passage into the aircraft when the aircraft lands in water.

* * * * *